Patented Sept. 19, 1950

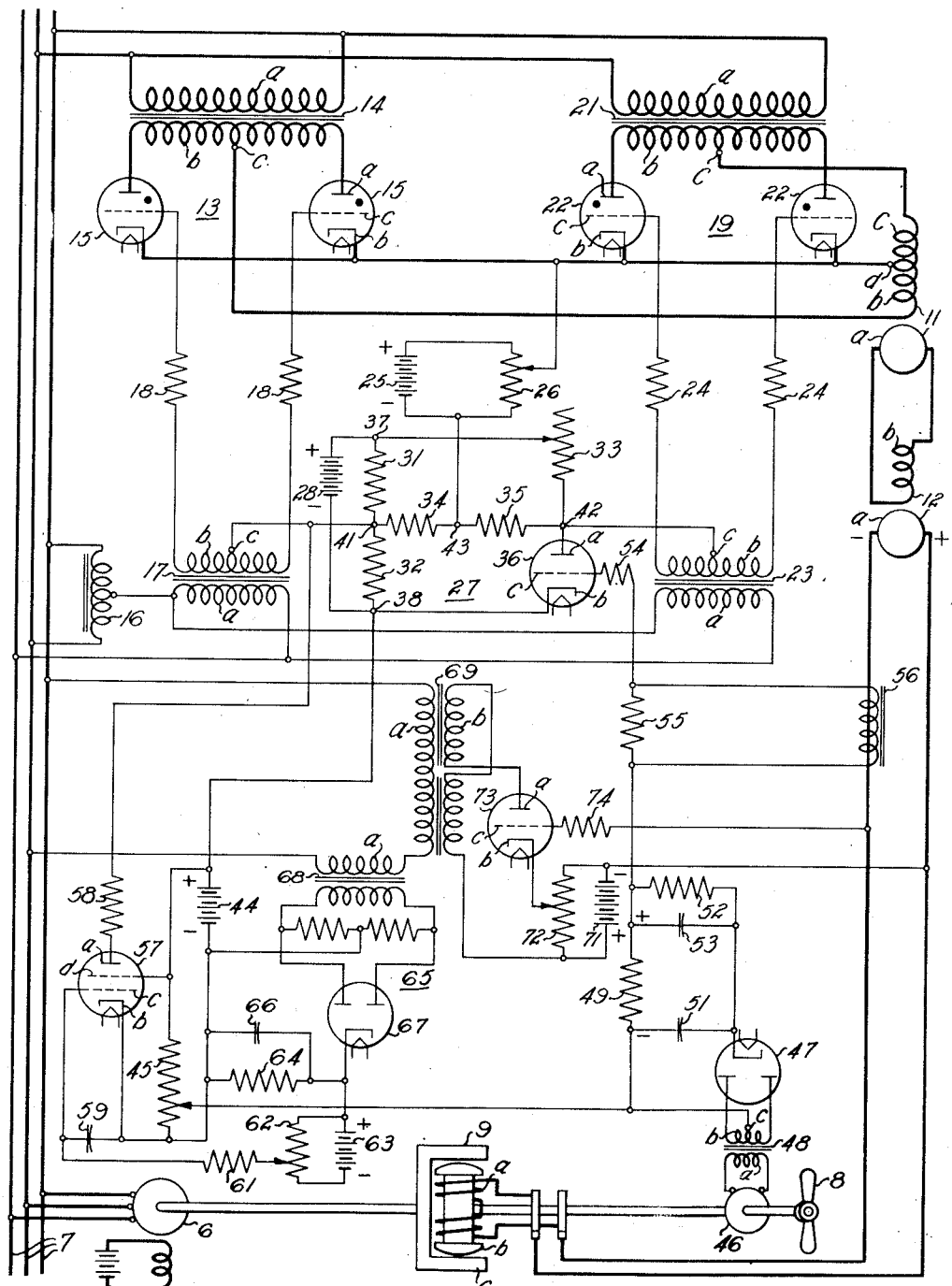

2,523,047

UNITED STATES PATENT OFFICE 2,523,047

DYNAMOELECTRIC MACHINE FIELD REVERSING SYSTEM RESPONSIVE TO ARMATURE CURRENT

Allan C. Halter, Milwaukee, Wis., assignor to Allis-Chalmers Manufacturing Company, Milwaukee, Wis., a corporation of Delaware Application March 6, 1946, Serial No. 652,316

13 Claims. (Cl. 172—284)

1

This invention relates in general to improvements in electric control systems and more particularly to means for controlling a dynamoelectric machine to limit the extent of reversal of the magnetic field thereof in such manner as to avoid disturbances which may result from protracted operation with reversed field.

A dynamoelectric machine forming part of a system of which the operation is to be regulated may be provided with differentially connected field windings or with a field winding connected with a source of reversible polarity to permit reversing the magnetic field of the machine and thereby accelerate the regulation of the system. For example, an eddy current coupling for driving a variable speed load device from a constant speed motor may be variably energized from a main exciter associated with a pilot exciter of which the field current may be regulated to the point of being reversed in response to variations in the speed of the load device. Reversal of the field current of the pilot exciter in response to increase in the speed of the load device above the desired value is advantageous to accelerate the return of the speed to the desired value. If however the coupling current should also reverse and reach a sufficiently high value to cause the speed of the load device to increase, the speed responsive control would cause the coupling to drive the load device at its maximum speed regardless of the setting of the control.

To prevent the current of the coupling from reaching such reverse value with a substantial margin of safety, it is advantageous to prevent any reversal of the voltage impressed on the coupling winding from the main exciter. If the residual magnetization of the main exciter is neglected, it may be considerd that the voltage of the main exciter is proportional to its field current so that preventing reversal of the voltage of the coupling winding corresponds to preventing reversal of the current supplied from the pilot exciter to the main exciter field winding. The desired limitation of the variation of the coupling current may therefore be obtained by providing the speed regulating system controlling reversal of the pilot exciter field current with a control element responsive to decrease in the voltage of the coupling winding below a predetermined value or responsive to some other quantity related to the value of the coupling current.

It is therefore an object of the present invention to provide a control system for a dynamoelectric machine of which the magnetic field

2 can be reversed, in which system such reversal is controlled in accordance with an operating condition of the system.

Another object of the present invention is to provide a control system for a dynamoelectric machine which may be supplied with field current from oppositely acting sources, in which system the selective connection of the sources is controlled in response to an operating condition of the system.

Objects and advantages other than those above set forth will be apparent from the following description when read in connection with the acompanying drawing, which diagrammatically illustrates one embodiment of the present invention applied to the control of a variable speed drive utilizing an eddy current coupling.

Referring more particularly to the drawing by characters of reference, numeral 6 designates an electric motor of any type of which the speed is not regulated, such as the alternating current synchronous type, which is assumed to be energized from a suitable source of current such as an alternating current circuit 7. Motor 6 is assumed to drive a load device such as a fan 8 operating at variable speed through an eddy current coupling 9 comprising magnetically linked driving and driven members. One of the coupling members is provided with an exciting winding 9a which is energized from circuit 7 through suitable rectifying means, the output of the rectifying means being amplified by a pilot exciter 11 and a main exciter 12. Winding 9a is connected with armature winding 12a of exciter 12, and field winding 12b is connected with armature winding 11a of pilot exciter 11. Armature winding 11a is associated with two differentially connected field windings 11b, 11c having a common terminal 11d. Winding 11b may be energized from circuit 7 through a rectifier generally deisgnated 13 of any suitable known type to establish the necessary magnetic field in pilot exciter 11.

Rectifier 13 may comprise a transformer 14 having a primary winding 14a connected with circuit 7 and having a secondary winding 14b provided with a midtap 14c connected with one of the terminals of winding 11b. The terminals of winding 14b are connected with the anodes 15a of a pair of electric valves 15 having their cathodes 15b connected with terminal 11d. Valves 15 are preferably of the thyratron type provided with control grids 15c but may also be of the ignitron or other suitable type. Grids 15c may be impressed with different potential components including an alternating component of suitable phase and magnitude obtained from circuit 7 through a phase shifting circuit comprising auto-transformer 16, a grid transformer 17 and a pair of current limiting resistors 18.

Winding 11c may likewise be energized from circuit 7 through a second rectifier 19 comprising a transformer 21 and a pair of thyratrons 22 having their cathodes 22b connected with terminal 11d. Grids 22c may be impressed with different potential components including an alternating component identical to that of grids 15c obtained from circuit 7 through auto-transformer 16, a second grid transformer 23 and a pair of current limiting resistors 24.

A common variable unidirectional potential component may be impressed simultaneously on grids 15c, 22c from any suitable source of direct current conventionally represented as a battery 25, through a voltage divider 26 having a movable tap connected with cathodes 15b, 22b. To cause rectifiers 13, 19 to selectively supply oppositely acting variable current to windings 11b, 11c, common means are provided for simultaneously varying the unidirectional potential component of grids 15c, 22c in opposite senses. Such potential variation is effected by means of a bridge circuit generally designated 27 energized from any suitable source of direct current of substantially constant voltage such as a battery 28.

The bridge circuit comprises five constant resistance elements 31 to 35 and an electric valve of any suitable type such as a triode 36 serving as variable element. The bridge elements define a pair of input terminals 37, 38 connected with battery 28, a pair of output terminals 41, 42 and a neutral terminal 43 intermediate the output terminals. Terminal 41 is connected with grid 15c through a connection joining terminal 41 with the secondary neutral point 17c of transformer 17. Likewise terminal 42 is connected with grid 22c through a connection joining terminal 42 with the secondary neutral point 23c of transformer 23. Terminal 43 is connected with terminal 11d through voltage divider 26. The potential difference between terminals 41, 42 may be varied in response to an operating condition of the system by means connected with cathode 36b of triode 36 for impressing a variable control potential on grid 36c thereof.

The control potential comprises an adjustable constant component obtained from a source of constant unidirectional voltage conventionally represented as a battery 44, through an adjustable voltage divider 45. The control potential further comprises a variable unidirectional component responsive to the speed of fan 8 and obtained from a tachometer generator 46 driven in unison with the fan. The output voltage of tachometer 46 is rectified by any suitable known means such as a full-wave rectifier 47 associated with a transformer 48. The rectified output voltage of rectifier 47 is impressed on a resistor 49 serially connected with voltage divider 45 between cathode 36b and grid 36c. A filter capacitor 51 is provided for rendering the output voltage of rectifier 47 substantially uniform.

The connections between rectifier 47 and resistor 49 comprise a resistor 52 connected in parallel with a capacitor 53 to form an anti-hunting element responsive to the rate of change of the speed of fan 8. Resistor 49 is connected with grid 36c through a current limiting resistor 54 and a resistor or shunt 55. The terminals of resistor 55 are connected with the secondary winding of a current transformer 56 having its primary winding serially connected with armature winding 12a and coupling winding 9a to impress on resistor 55 a voltage responsive to the rate of change of the current of winding 5a and thereby assist the anti-hunting action of resistor 52 and capacitor 53 in response to variations of the current of armature winding 11a.

Additional anti-hunting means responsive to the rate of change of the currents of windings 11b, 12b or to the rate of change of the voltages of armature windings 11a, 12a may be provided to further improve the stability of operation of the system. Such additional anti-hunting means may however generally be omitted if the time constants of windings 11b, 12b are negligible compared to the time constant of winding 9a.

To prevent reversal of the voltage impressed on coupling winding 9a from armature winding 12, bridge circuit 27 is controlled in response to decrease of such voltage below a predetermined value. The means provided for the latter purpose comprise an electric valve such as a tetrode 57 and a plate resistor 58 serially connected between terminal 41 and the negative terminal of battery 44. Control grid 57c of tetrode 57 is connected to the associated cathode 57b through a surge diverting capacitor 59. Variable potentials may be impressed on grid 57c through a current limiting resistor 61 from a voltage divider 62 energized from a battery 63 or other source of direct current and from a resistor 64 variably energized from circuit 7 through a rectifier of any suitable type generally designated 65. The flow of current through resistor 64 may be rendered substantially uniform by means of a filter capacitor 66.

Rectifier 65 may comprise a full wave rectifying device 67 and a transformer 68 having a primary winding 68a connected with circuit 7 through the inductive winding 69a of a reactor 69. The reactor is provided with a saturating winding 69b so disposed with respect to winding 69a as to equally affect both half waves of current flowing through winding 69a. Winding 69b may be energized from a source of direct current such as a battery 71 through a voltage divider 72 and through an electric valve of any suitable type such as a triode 73. The negative terminal of voltage divider 72 is connected with the positive terminal of armature winding 12a and grid 73c is connected with the negative terminal of armature winding 12a through a current limiting resistor 74.

The electrical characteristics of the different control elements of the system cannot be specified generally but are to be selected to meet the operating requirements of each particular system. It has been found that the operation of a 6500 H. P. eddy current coupling may be controlled by means including a pilot exciter requiring a maximum excitation current of 0.5 ampere at 24 volts and of control elements identified by the following engineering data:

| | |
|---|---|
| Triode 73 | type 6J5 |
| Thyratrons 15, 22 | type ELC6J |
| Triode 36 | type 6N7 |
| Tetrode 57 | type 6F6 |
| Rectifiers 47, 67 | type 6X5 |
| Battery 25 | 40 volts |
| Battery 44 | 105 volts |
| Battery 28 | 300 volts |
| Battery 71 | 250 volts |
| Windings 14b, 21b | 2×40 volts |
| Windings 11b, 23b | 2×3 volts |

| | |
|---|---|
| Winding 48b | 2×150 volts |
| Resistor 48 | 2500 ohms |
| Resistor 52 | 10 kilo-ohms |
| Resistor 26 | 10 megohms |
| Resistors 31, 32 | 25 megohms |
| Resistors 18, 24, 33, voltage divider 72 | 50 megohms |
| Resistor 55 | 80 megohms |
| Resistors 34, 35, 49, 54, 64 | 100 megohms |
| Voltage divider 62, resistor 58 | 200 megohms |
| Resistors 61, 74 | 500 megohms |
| Capacitor 59 | 0.1 microfarad |
| Capacitor 66 | 0.25 microfarad |
| Capacitor 51 | 1 microfarad |
| Capacitor 53 | 16 microfarads |

In operation, circuit 7 being energized, motor 6 is caused to rotate at the synchronous speed thereof to drive one of the elements of coupling 9. When winding 9a receives current the magnetic flux induced thereby in coupling element 9b closes its circuit through coupling element 9c and induces therein eddy currents which cause a torque to be transmitted between the coupling elements. Load device 8 is thus driven at a speed depending on the magnitude of the flow of current through winding 9a and on the torque-speed characteristic of device 8. Excitation current for winding 9a is normally obtained from circuit 7 through rectifier 19 and dynamoelectric machines 11, 12. Rectifier 19 supplies current to winding 11c, thereby causing armature winding 11a to supply amplified current to field winding 12b. The excitation current is further amplified by dynamoelectric machine 12 and supplied to winding 9a.

As a result of the connection between bridge circuit 27 and grids 22c, thyratrons 22 are rendered variably conductive in response to variation in the potential of grid 36c through lower range of values and are rendered nonconductive in response to the potential of grid 36c being raised above such lower range. Likewise thyratrons 15 are rendered variably conductive in response to variation of the potential of grid 36c through an upper range of values and are rendered nonconductive in response to the potential of grid 36c dropping below such upper range. The lower range of values of the grid potential may be made to correspond to the range of steady state operation of fan 8 at different speeds between zero and the maximum normal speed thereof by suitable choice of autotransformer 16 and by suitable adjustment of bridge circuit 27 and of voltage divider 26. If the voltages of grid transformers 17, 23 lag ninety degrees behind the voltages of anode transformers 14, 21 and if bridge circuit 27 is balanced when grid 36c is at the potential of the associated cathode 36b, the two ranges of values above defined may be made to be adjacent, to overlap, or to be separated by a gap by varying the adjustment of voltage divider 26. It will be assumed herein that the two ranges are adjacent so that variations of the potential of grids 36c will always result in one of rectifiers 13, 19 being operative to supply variable current to a selected one of windings 11b, 11c but will never cause both rectifiers to be operative simultaneously.

Assuming fan 8 to be driven at a constant speed which is the desired speed established by adjustment of voltage divider 45, rectifier 47 impresses on the terminals of resistor 49 a voltage proportional to the speed of fan 8. Grid 36c is impressed with the resultant of oppositely directed potentials from voltage divider 45 and resistor 49 to maintain triode 36 in a predetermined state of conductivity. Bridge circuit 27 is thus caused to have a predetermined degree of unbalance which results in the appearance of a predetermined positive voltage between terminals 42, 43 and of an equal negative voltage between terminals 41, 43. Grids 22c are thus impressed with a negative potential component from voltage divider 26, a positive potential component from bridge circuit 27, and an alternating component from winding 23b. As a result thereof, rectifier 19 supplies to winding 11c current of the required intensity to maintain the speed of fan 8 at the desired value. At the same time grids 15c are impressed with a negative potential component from resistor 26, another negative potential component from bridge circuit 27, and an alternating potential component from winding 17b whereby thyratrons 15 are continuously maintained nonconductive.

During the above described operation of the system, winding 68a is energized from circuit 7 through reactor winding 69a, and rectifier 65 supplies current to resistor 64 to cause grid 57c to be imparted a positive potential component from resistor 64 in opposition to a larger negative potential component from voltage divider 62. Grid 73c is maintained by battery 71 and armature winding 12a at a sufficiently low variable potential to maintain triode 73 nonconductive. Winding 69b is accordingly without current and the core of reactor 69 remains unsaturated to impart to reactor 69 its maximum inductance. The voltage impressed on winding 68a is thus of such low value that the resultant potential impressed on grid 57c from resistor 64 and voltage divider 62 is sufficiently highly negative to maintain tetrode 57 nonconductive. Tetrode 57 is then without effect on the operation of the system.

If the speed of fan 8 decreases below the desired value for any reason, the voltage of generator 46 decreases to a corresponding extent, thereby causing the potential of grid 36c to drop. The conductivity of triode 36 decreases and the unbalance of grid circuit 27 increases to raise the potential of terminal 42 and thereby increase the conductivity of thyratrons 22. Thyratrons 22 supply a higher current to winding 11c, thereby causing the current of winding 9a to increase gradually to a sufficient extent to restore the speed of fan 8 to substantially the value corresponding to the setting of voltage divider 45. During such regulating operation the voltage impressed between grid 36c and cathode 36b is affected by the voltage drop in resistor 52, which varies with the rate of change of the speed of fan 8, and by the voltage impressed on resistor 55 which is proportional to the rate of change of the current in winding 9a. The speed of fan 8 is thus prevented from overshooting the desired value. The same action takes place if the speed setting is raised by downward adjustment of the tap of voltage divider 45.

A sequence of operation converse of that above described takes place when the speed of fan 8 increases above the desired value or when the speed setting is lowered by upward adjustment of the tap of voltage divider 45. The potential of grid 36c then rises and bridge circuit 27 becomes less unbalanced to cause the conductivity of thyratrons 22 to be decreased.

The increase in speed of fan 8 or the change of setting of voltage divider 45 may take place sufficiently rapidly to cause bridge circuit 27 to pass through the balance point thereof to momentarily drop the potential of terminal 42 below the potential of terminal 41. As a result of the herein assumed adjustment of elements of the system, thyratrons 22 are thereby rendered nonconductive and thyratrons 15 are rendered conductive to a variable extent depending upon the degree of unbalance of bridge 27. Winding 11c is thereby deenergized and winding 11b is energized instead. As a result of the differential connection of the two field windings, the magnetic field of pilot exciter 11 is reversed, and the voltage induced in armature winding 11a is also reversed in a length of time depending on the inductance of windings 11b, 11c. The inductance of winding 12b prevents the flow of current through armature winding 11a and field winding 12b from reversing instantly, but the current gradually decreases and, if thyratrons 15 remain conductive for a sufficient length of time, the current through winding 12b will eventually reverse. The voltage of armature winding 12a, which is substantially proportional to the current in field winding 12b, is thus caused to decrease at a rapid rate.

If the current of armature winding 11a drops to a predetermined value in response to momentary energization of field winding 11b, the voltage of armature winding 12a drops to a corresponding value bringing grid 73c to a potential which is less negative than the cutoff potential of triode 73. Current is then abruptly supplied from battery 71 to winding 69b through triode 73 to saturate the core of reactor 69. The inductance of winding 69a is thereby abruptly reduced and the voltage impressed on winding 48a is increased. Rectifier 65 accordingly supplies to resistor 84 an increased current, with the result that the potential of grid 57c is raised to a sufficient extent to render tetrode 57 conductive. Current then flows from battery 44 through terminal 38, resistor 32, terminal 41, resistor 58, and tetrode 57 back to the battery, and the voltage drop produced by such current in resistor 32 depresses the potential of terminal 41. Bridge circuit 27 is thus caused to return through the balance point thereof to cause terminal 41 to become negative with respect to terminal 42, whereby thyratrons 15 are rendered nonconductive to effectively disconnect winding 11b from circuit 7. At the same time, thyratrons 22 are rendered conductive to cause exclusive energization of winding 11c to oppose further operation of pilot exciter 11 with reversed field. The voltage impressed on winding 9a is thus prevented from dropping further, thus also avoiding the danger of reversal of the current through winding 9a. The speed of fan 8 returns toward the desired value in response to variation of the current of winding 11c alone unless the voltage of winding 9a again rises above the value at which triode 73 is rendered conductive.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a system comprising a dynamoelectric machine having an armature winding and field winding means and a source of excitation current, the combination of means connecting said source with said field winding means for establishing a magnetic field in said machine, means for reversing said magnetic field, and means responsive to decrease of the current of said armature winding below a predetermined value for controlling said field reversing means.

2. In a system comprising a source of current and a dynamoelectric machine having an armature winding and a pair of differentially connected field windings, the combination of means connecting said field windings with said source, and means responsive to decrease of the current of said armature winding below a predetermined value for causing interruption of the supply of current to a predetermined one of said field windings from said source.

3. In a system comprising a source of current and a dynamoelectric machine having an armature winding and a pair of differentially connected field windings, the combination of means connecting said field windings with said source, means comprising a bridge circuit having a pair of output terminals for controlling the values of the currents of said field windings, regulating means responsive to an operating condition of said system connected with an element of said bridge circuit to cause the potential difference between said output terminals to vary in magnitude and to have one or the other polarity to cause said field windings to be selectively energized with current of variable magnitude, and means differently responsive to variations of another operating condition of said system above and below a predetermined value connected with an element of said bridge circuit overcoming the action of said regulating means to cause the potential difference between said output terminals to have said one polarity for causing exclusive energization of a predetermined one of said field windings.

4. In a system comprising a source of alternating current and a dynamoelectric machine having first and second differentially connected field windings, the combination of a pair of rectifiers connecting said source with said field windings, regulating means responsive to an operating condition of said system controlling said rectifiers to cause said field windings to be selectively energized with current of variable magnitude, and means differently responsive to variations of another operating condition of said system above and below a predetermined value for modifying the action of said regulating means to cause exclusive energization of said first field winding.

5. In a system comprising a source of alternating current and a dynamoelectric machine having first and second differentially connected field windings, the combination of a pair of rectifiers, each said rectifier connecting one of said field windings with said source and comprising an electric valve having a control element, means for impressing potential on the different said control elements, regulating means responsive to an operating condition of said system for simultaneously varying the potentials of the different said control elements in opposite senses to cause selective energization of said field windings with variable current, and means differently responsive to variations of another operating condition of said system above and below a predetermined value connected with said regulating means for modifying the action thereof to cause exclusive energization of said first field winding.

6. In a system comprising a dynamoelectric machine having an armature winding and field winding means and a source of excitation current, the combination of means connecting said source with said field winding means for establishing a magnetic field in said machine, means for reversing said magnetic field comprising an electric valve, and means responsive to decrease of the current of said armature winding below a predetermined value for rendering said valve conductive to cause operation of said field reversing means.

7. In a system comprising a source of current and a dynamoelectric machine having an armature winding and first and second differentially connected field windings, the combination of means comprising an electric valve for controlling the connection of said field windings with said source, means comprising a bridge circuit having a pair of output terminals for controlling the values of the currents of said field windings, regulating means responsive to an operating condition of said system connected with an element of said bridge circuit to cause the potential difference between said output terminals to vary in magnitude and to have one or the other polarity to cause said field windings to be selectively energized with current of variable magnitude, and means differently responsive to variations of another operating condition of said system above and below a predetermined value for rendering said valve conductive for overcoming the action of said regulating means to cause the potential difference between said output terminals to have said one polarity causing exclusive energization of said first field winding.

8. In a system comprising a source of current and a dynamoelectric machine having an armature winding and a pair of differentially connected field windings, the combination of means connecting said field windings with said source, means comprising a bridge circuit having a pair of output terminals for controlling the values of the currents of said field windings, regulating means responsive to an operating condition of said system connected with an element of said bridge circuit to vary the magnitude and polarity of the potential difference between said output terminals to cause said field windings to be selectively energized with current of variable magnitude, an electric valve connected across an element of said bridge circuit, and means responsive to another operating condition of said system for rendering said valve conductive to control said bridge circuit for overcoming the action of said regulating means to cause the potential difference between said output terminals to have a predetermined polarity causing exclusive energization of a predetermined one of said field windings.

9. In a system comprising a source of alternating current and a dynamoelectric machine having first and second differentially connected field windings, the combination of a pair of rectifiers connecting said source with said field windings, regulating means responsive to an operating condition of said system controlling said rectifiers to cause said field windings to be selectively energized with current of variable magnitude, means controlling said regulating means comprising an electric valve, and means differently responsive to variations of another operating condition of said system above and below a predetermined value for rendering said valve conductive for modifying the action of said regulating means to cause exclusive energization of said first field winding.

10. In a system comprising a source of current and a dynamoelectric machine having first and second differentially connected field windings, the combination of means connecting said source with said field windings, regulating means responsive to an operating condition of said system controlling said source to cause said field windings to be selectively energized with current of variable magnitude, and means differently responsive to variations of another operating condition of said system above and below a predetermined value for modifying the action of said regulating means to cause exclusive energization of said first field winding.

11. In a system comprising a dynamoelectric machine having an armature winding, the combination of field winding means for controlling the excitation of said dynamoelectric machine, a source of excitation current, means connecting said source with said field winding means for establishing a magnetic field in said machine, means for reversing said magnetic field, and means responsive to a decrease of the voltage of said armature winding below a predetermined value for controlling said field reversing means.

12. In a system comprising a source of current and a dynamoelectric machine having an armature winding, the combination of a pair of differentially connected field windings for controlling the excitation of the machine, means connecting said field windings with said source for establishing a magnetic field in said machine, and means responsive to decrease of the voltage of said armature winding below a predetermined value for causing interruption of the supply of current to a predetermined one of said field windings from said source.

13. In a system comprising a dynamoelectric machine having an armature winding and a source of excitation current, the combination of field winding means for controlling the excitation of said machine, means connecting said source with said field winding means for establishing a magnetic field in said machine, means for reversing said magnetic field comprising an electric valve, and means responsive to decrease of the voltage of said armature winding below a predetermined value for rendering said valve conductive to cause operation of said field reversing means.

ALLAN C. HALTER.

REFERENCES CITED

The following references are of record in the file of this patent:

UNITED STATES PATENTS

| Number | Name | Date |
| --- | --- | --- |
| 921,299 | Sprong et al. | May 11, 1909 |
| 1,480,320 | Von Arco | Jan. 8, 1924 |
| 1,684,138 | Nixdorff | Sept. 11, 1928 |
| 1,703,280 | Minorsky | Feb. 26, 1929 |
| 1,988,006 | Greig | Jan. 15, 1935 |
| 2,387,795 | Issersted | Oct. 30, 1945 |
| 2,399,675 | Hays | May 7, 1946 |